United States Patent [19]

Hurst, Jr.

[11] Patent Number: 5,046,164
[45] Date of Patent: Sep. 3, 1991

[54] INTERSTITIAL LINE GENERATOR FOR AN INTERLACE TO NON-INTERLACE SCAN CONVERTER

[75] Inventor: Robert N. Hurst, Jr., Hopewell, N.J.

[73] Assignee: RCA Licensing Corporation, Princeton, N.J.

[21] Appl. No.: 408,969

[22] Filed: Sep. 18, 1989

[51] Int. Cl.$^5$ .............................................. H04N 7/01
[52] U.S. Cl. ...................................... 358/140; 358/11
[58] Field of Search .......................... 358/11, 140, 167

[56] References Cited

U.S. PATENT DOCUMENTS

| | | | |
|---|---|---|---|
| 4,677,483 | 6/1987 | Dischert et al. | 358/140 |
| 4,698,675 | 10/1987 | Casey | 358/140 |
| 4,785,351 | 11/1988 | Ishikawa | 358/140 |
| 4,789,893 | 12/1988 | Weston | 358/136 |

FOREIGN PATENT DOCUMENTS 2151431  7/1985  United Kingdom .

OTHER PUBLICATIONS

Christian Hentschel, "Linear and Nonlinear Procedures for Flicker Reduction", IEEE Trans. on Consumer Electronics, vol. CE-33, No. 3, pp.192-198, Aug. 87.

Primary Examiner—Victor R. Kostak
Attorney, Agent, or Firm—Joseph S. Tripoli; Eric P. Herrmann; James B. Hayes

[57] ABSTRACT

An interstitial line generator for an interlaced scan to non-interlaced scan video signal converter includes circuitry for examining a plurality of lines spatially and temporally disposed about an interstitial line location and excludes signals having amplitudes representing the relative extrema of the plurality of lines. The remaining signals are combined in predetermined proportions to generate the interstitial line.

4 Claims, 4 Drawing Sheets

INTERSTITIAL LINE GENERATOR FOR AN INTERLACE TO NON-INTERLACE SCAN CONVERTER

This invention relates to video signal processing circuitry as for converting interlaced scanned to non-interlaced scanned signals.

BACKGROUND OF THE INVENTION

It is known to convert video signals from interlaced format to non interlaced format in order to improve the apparent quality of reproduced images. In this procedure, in each field of video signal, lines of video signal are artificially generated, to occur interstitial to the standard field lines. Typical methods for artificially generating the interstitial lines include: repeating the values of the real line occurring immediately before or after the interstitial line; averaging the real lines occurring spatially above and below the interstitial line; averaging the real lines occurring temporally before and after the interstitial line; or a combination of the latter two methods. In the last mentioned method, spatially and temporally averaged lines are combined in proportions depending upon detected motion between image frames. A further method for generating interstitial lines, called fixed interpolation, includes averaging signals from a plurality of lines from a plurality of fields (e.g. five), which lines are symmetrically disposed about the interstitial line position.

Each of the foregoing systems have particular disadvantages. The repeat line systems generate jagged edges on diagonal lines. The spatial averaging system tends to exhibit a loss in vertical resolution. The temporal averaging system introduces motion artifacts. The motion adaptive system tends to be complicated and the performance of known motion detectors is marginal. For low amplitude video signals motion detectors tend to be unable to discriminate motion information from signal noise. Finally the fixed interpolator method is relatively expensive and does exhibit some motion artifacts.

It is an object of the present invention to provide a method and apparatus for generating interstitial video lines without undesirable artifacts using a minimum of processing circuitry.

SUMMARY OF THE INVENTION

The interstitial line generator of the present invention includes signal delay circuitry for concurrently providing a plurality of lines of video signal disposed about the location of the interstitial line to be generated. The relative values of the amplitudes of the signals representing the plurality of lines are compared. The signals exhibiting the maximum and minimum extrema are eliminated and the remaining signals are combined in predetermined proportions to provide the interstitial lines.

Detailed Description

Figure 1:
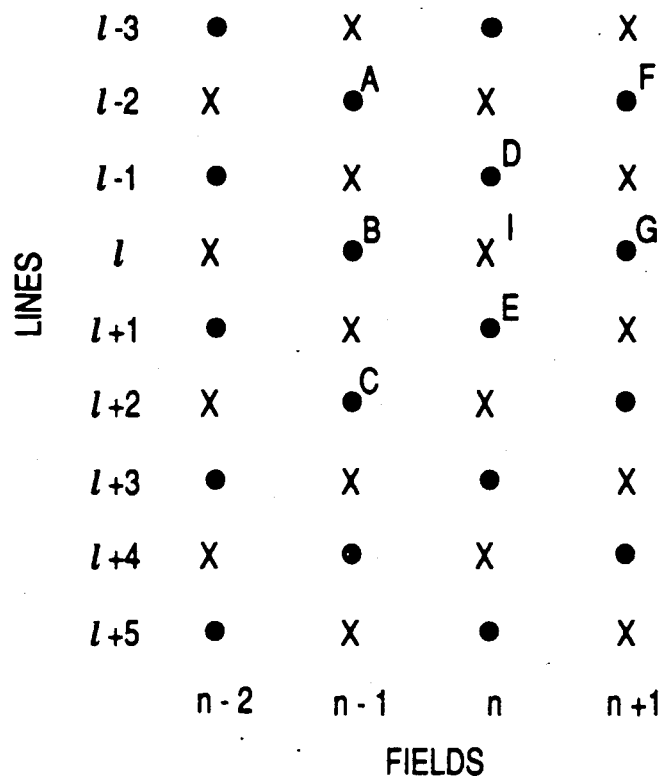
FIG. 1 is a pictorial representation of horizontal lines of video signal in a plurality of successive fields of video signals.

FIG. 1 shows a portion of a plurality of field intervals $n-2$, $n-1$, $n$, $n+1$, of an interlaced video signal. A portion of the number of video lines in the respective fields are indicated by the dots (assuming the lines go into the paper). Even numbered lines occur in even numbered fields and odd numbered lines occur in odd numbered fields. The x's indicate interstitial lines that are to be generated to produce a non-interlaced video signal from the interlaced signal.

Figure 2:
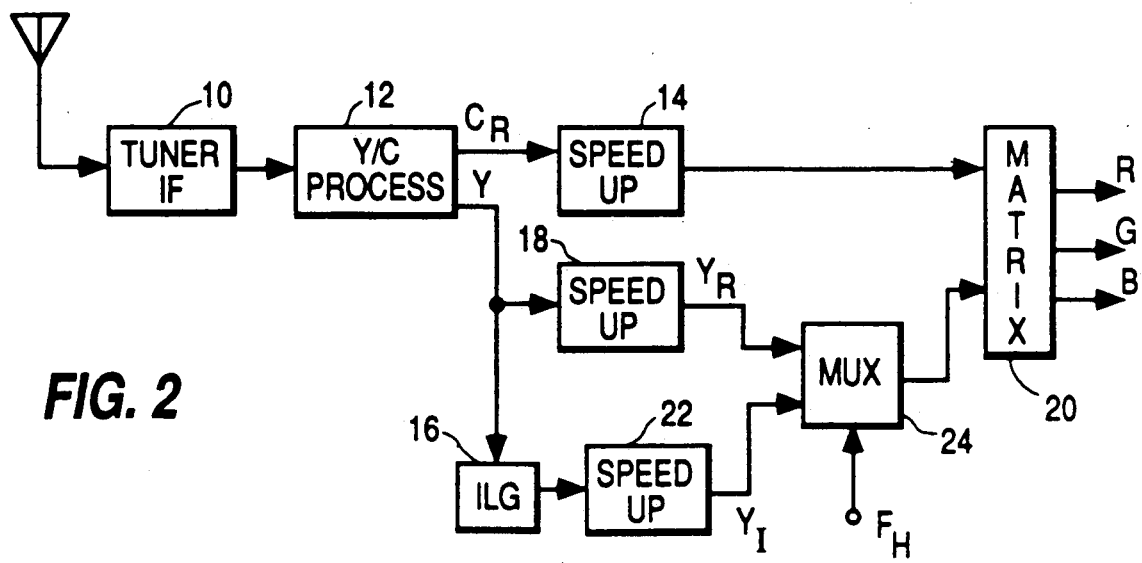
FIG. 2 is a block diagram of a portion of a television receiver including an interlaced scan to non interlaced scan converter.

FIG. 2 illustrates the typical environment for an interlaced-to-non-interlaced video signal converter. Baseband composite video signal from, for example, the tuner/IF circuitry, 10, of a television receiver is coupled to video signal processing circuitry 12. The processing circuitry 12 may include conventional luminance and chrominance separation circuitry, hue correction circuitry, contrast and saturation control circuitry, and circuitry for generating deflection and synchronization signals. Samples of the chrominance component signals, $C_R$, are coupled to speed up circuitry 14 wherein they are stored at the normal or received sample rate and then read out twice at double the normal sample rate. The twice sample rate chrominance component signals are applied to a matrix circuit 20.

If desired, rather than simply repeating lines of chrominance signal, interstitial lines of chrominance signal may be generated using circuitry of the type to be described below for generating interstitial lines of luminance signal.

The luminance component signal provided by the processing circuitry 12 is coupled to an interstitial line generator 16, and to a speed up circuit 18. The speed up circuit 18 loads the luminance component Y at the normal rate, and provides a twice rate real line of luminance signal. The output signal from the speed up circuit 18 is coupled to a first signal input connection of a 2 to 1 multiplexer 24.

The interstitial line generator 16, responsive to the luminance component Y, generates an imaginary or interstitial line $Y_I$ of luminance signal. This interstitial line is applied to a further speed up circuit 22. The speed up circuit 22 loads the interstitial line at the normal rate and outputs the line at twice the normal rate. The twice rate interstitial line signal is coupled to a second input terminal of the multiplexer 24. The multiplexer 24 is controlled by a line rate square wave signal to alternately couple the twice rate real luminance signal $Y_R$ and the twice rate interstitial luminance signal $Y_I$ to a second input connection of the matrix 20, wherein the luminance and chrominance components are combined to produce primary color signals R, G, B for energizing, for example, a display device (not shown). In the circuitry of FIG. 2 it may be necessary to include compensating delay elements in ones of the chrominance and luminance signal paths to time align the respective signals. For example depending upon the particular interstitial line generator implemented, it may be necessary to delay the chrominance component c, and the real luminance component, $Y_R$, by a field interval.

Figure 3:
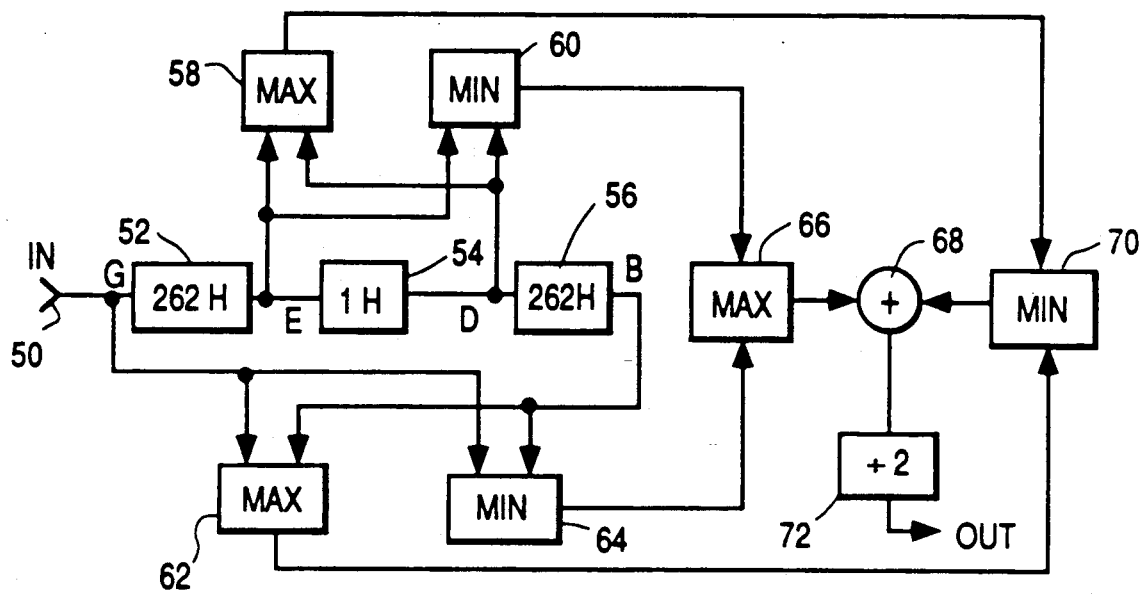
FIG. 3 is a block diagram of an interstitial line generator embodying the present invention.

An exemplary interstitial line generator embodying the present invention for generating an interstitial line I (FIG. 1) is illustrated in FIG. 3. In FIG. 3 a video signal, for example the luminance component y from the processing circuitry 12 of FIG. 2 is coupled via a connection 50 to a cascade connection of delay elements 52-56 which respectively provide luminance signal delayed by 262, 263 and 525 line intervals. The respective signals provided by delay elements 52-56 correspond to the lines designated E, D, B in FIG. 1. The input to delay element 52 corresponds to the line designated G in FIG. 1.

The signal provided from the delay element 52 is coupled to respective first input connections of a maximum detector 58 and a minimum detector 60. The signal provided by the delay element 54 is coupled to respective second input connections of the maximum detector 58 and the minimum detector 60. The maximum and minimum detectors respectively pass the larger and smaller (in amplitude) of the two signals coupled thereto.

The signal provided by the maximum detector 58 is coupled to a first input connection of a minimum detector 70. The signal provided by the minimum detector 60 is coupled to a first input connection of a maximum detector 66.

The input signal to delay element 52 is coupled to respective first input connections of a maximum detector, 62, and a minimum detector 64. Output signal provided by the delay element 56 is coupled to respective second input connections of the maximum detector 62 and the minimum detector 64. The maximum and minimum detectors 62 and 64 respectively pass the larger and smaller of the two signals applied to their respective input connections.

Output signal provided by the maximum detector 62 is coupled to a second input connection of the minimum detector 70. Output signal provided by the minimum detector 64 is coupled to a second input connection of the maximum detector 66.

The maximum and minimum detectors 58 and 60 respectively pass the larger and smaller of the signals representing lines D and E. The maximum and minimum detector 62 and 64 respectively pass the larger and smaller of the signals representing the lines B and G. The maximum detector 66 passes the larger of the signals passed by the minimum detectors 60 and 64 thereby excluding the smallest of the signals representing line B, D, E and G. The minimum detector 70 passes the smaller of the signals passed by the maximum detectors 58 and 62, thereby excluding the largest of the signals representing the lines B, D, E and G.

The signals passed by the minimum detector 70 and the maximum detector 66 are respectively coupled to the signal combining circuitry illustrated as an adder 68. The output signal provided by the combining circuitry is normalized by the divide-by-two circuit 72, the output of which represents the interstitial line.

It is to be noted, that in selecting the signals to be combined to provide the interstitial line, the signals having the most similar amplitudes are not selected. Rather the signals whose amplitudes are the extrema of the available signals are eliminated. For example assume that signals B, D, E and G have amplitudes corresponding to 0, 1, 20, and 22 units respectively. The signals 1 and 20 representing lines D and E will be combined, rather that the signals 0 and 1 or 20 and 22 which have similar values.

The apparatus illustrated in FIG. 3 utilized information from four lines in three fields to generate an interstitial line and provides good performance for most images. Certain images, however, such as images with alternating light and dark lines, are not correctly reproduced using a four point system. These images may be properly handled by incorporating information from a greater number of image lines. The circuitry illustrated in FIG. 4 utilizes information from eight image lines to form the interstitial line. The eight image lines are the lines designated A, B, C, D, E, F, G and H in the FIG. 1.

Figure 4:
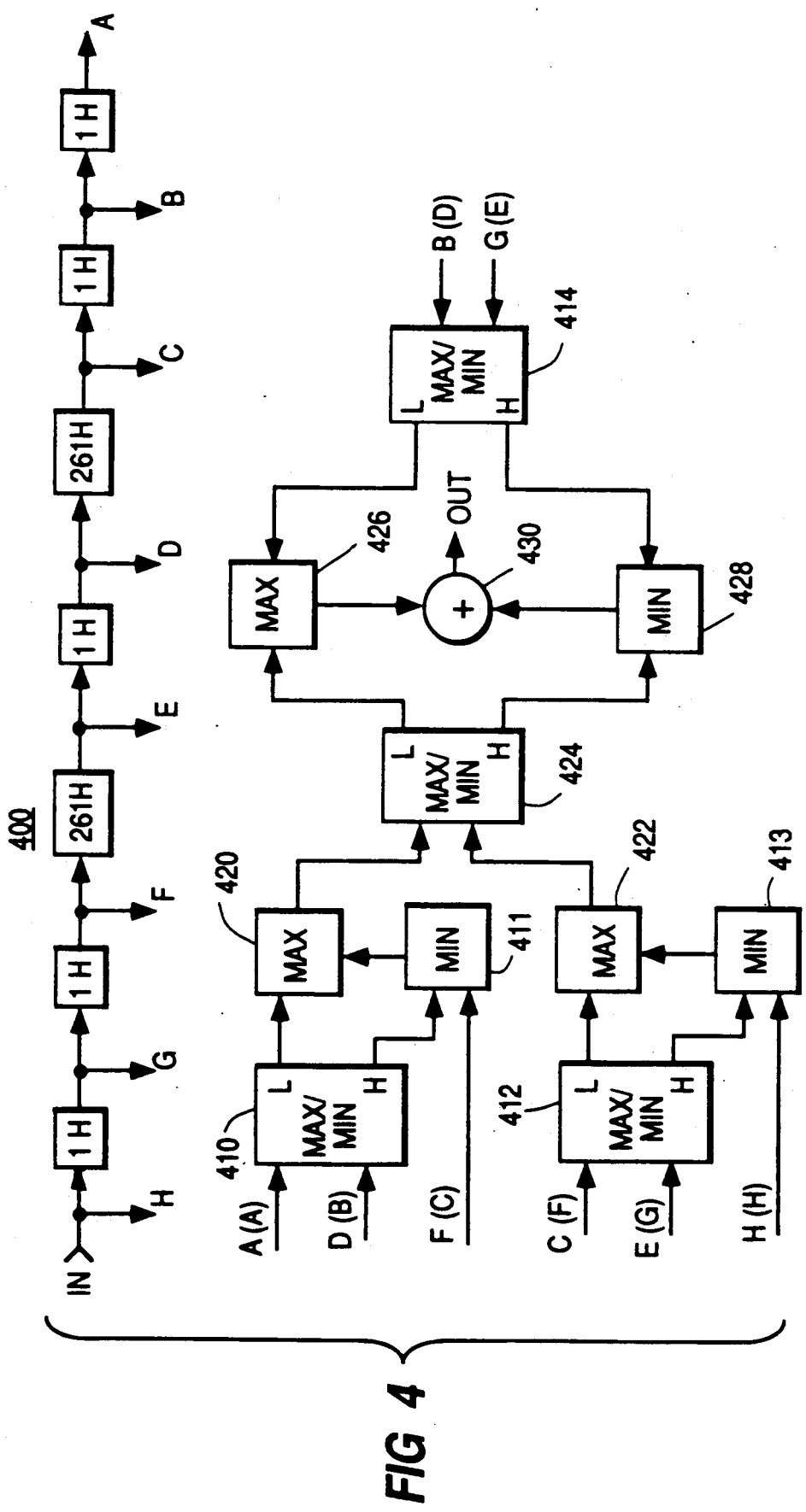
FIGS. 4 and 5 are block diagrams of alternative interstitial line generators.

The circuitry shown in FIG. 4 will perform either of two algorithms. The input signals applied to elements 410-414 are determinitive of the particular algorithm. For the first algorithm the signals A, D, F, C, E, H, B, and G, (from lines A-G) coupled to elements 410-414 and shown not in parenthesis in FIG. 4, are utilized. For the second algorithm the signals A, B, C, F, G, H, D, E (from lines A-G) coupled to elements 410-414 and shown in parenthesis in FIG. 4 are used.

In the first algorithm signals from the lines A, D and F are examined and the two extrema are excluded. Signals from the lines C, E and H are also examined and the two extrema excluded. The resulting signals from the examination of the lines A, D, F and C, E, H are compared with signals from the lines B and G, and the extrema of these four signals are excluded. The interstitial line is then generated from the average of the remaining two signals.

In the second algorithm signals from the lines A B and C are examined and the extrema of these signals are excluded. Signals from the lines F G and H are examined and the extrema of these signals are excluded. The resulting signals from the examination of the lines A, B, C and F, G, H are compared with the signals from the lines D and E and the extrema of these four samples are excluded. The interstitial line is generated from the remaining two signals.

In FIG. 4, signals from the lines A-H are provided by a tapped delay line 400 which includes the cascade connection of two 1-H delay elements, a 261-H delay element, a 1-H delay element a further 261-H delay element and two further 1-H delay elements. Signals from lines A and D are coupled to a maximum/minimum circuit 410 which provides the signals of lesser and greater amplitudes at output connections designated L and H respectively. Signal from the line F and the greater of signal from lines A and D, provided by circuit 410, are coupled to a minimum detector 411 which passes the signal having the lesser amplitude. The signal from the minimum detector 411 and the lesser signal provided by the circuit 410 are coupled to a maximum detector 420, which passes the greater of these two signals. The output signal from the maximum detector 420 is the signal from lines A D or F having the intermediate amplitude value.

Signals from the lines C E and H are coupled to similar circuitry 412, 413 and 422. The circuit 422 passes the signal from the lines C, E, and H having the intermediate amplitude value.

Signals from the circuits 420 and 422 are coupled to a maximum/minimum detector 424, which passes the signals having the lesser and greater amplitudes at respective output connections L and H. Signals from the lines B and G are coupled to a maximum/minimum detector 414, which passes the greater of signals B and G at an output connection H, and the lesser of signals B and G at an output connection L.

The signals of lesser amplitude value provided by the maximum/minimum detectors 424 and 414 are coupled to a maximum detector 426 which passes the greater of the lesser valued signals thereby excluding the relatively more negatively valued extrema. The greater valued signals provided by the maximum/minimum detectors 414 and 424 are coupled to a minimum detector 428. The minimum detector 428 passes the lesser of the greater valued signals thereby excluding the relatively more positive extrema. The signals passed by the maximum detector 426 and the minimum detector 428 are summed in an adder circuit 430 to produce the interstitial line.

Figure 5:
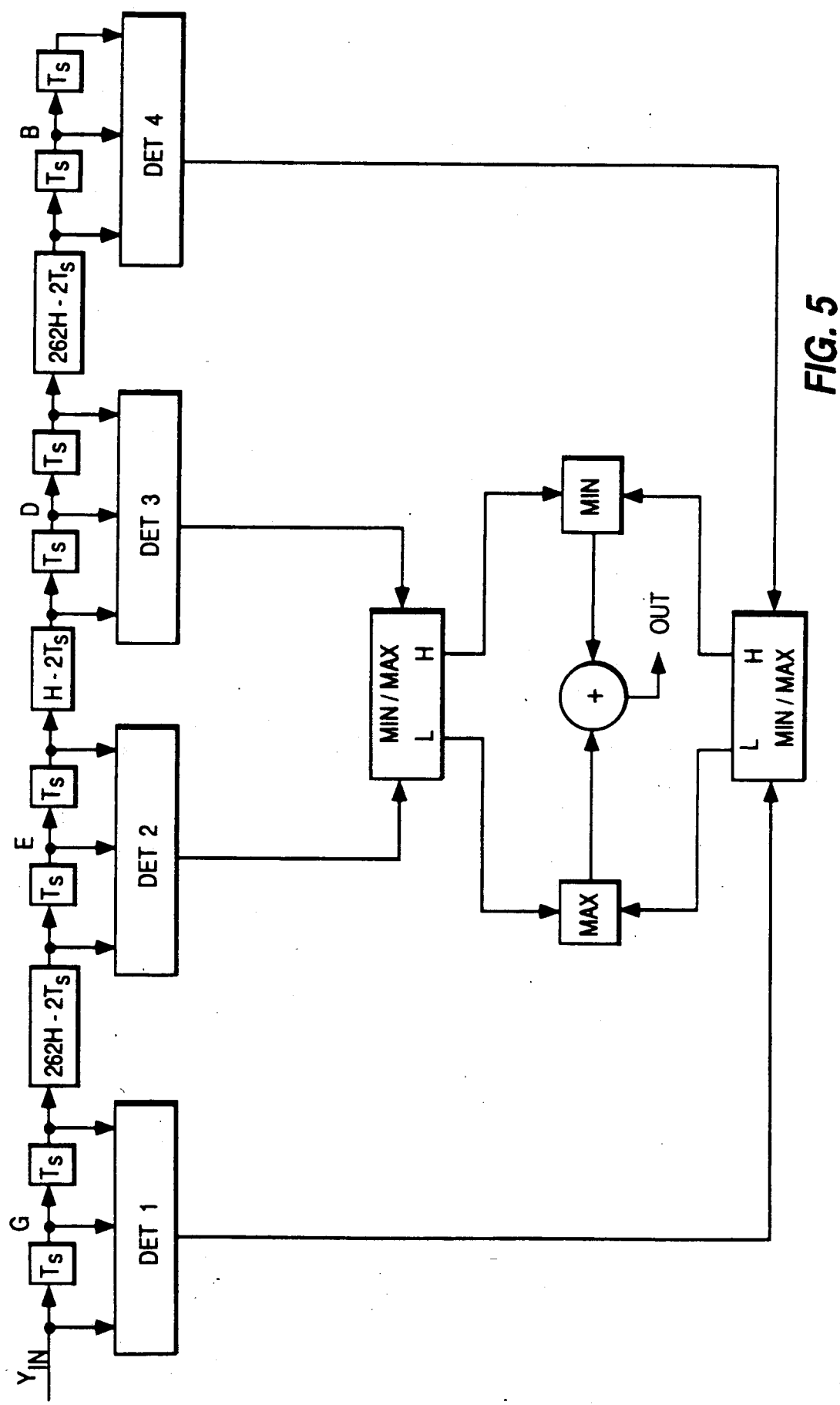

FIG. 5 illustrates a further alternative interstitial line generator. This circuitry develops an interstitial line from four lines (B, D, E, G) as does the FIG. 3 circuitry, but includes added signal information taken in the horizontal dimension along each of the four lines. In FIG. 5 each of the blocks designated $T_s$ is a delay element which provides a delay of an integral number of sample periods. The horizontal information along respective lines is first examined by the respective detectors DET1-DET4, each of which excludes the relative extrema from each line. DET1-DET4 may be configured in a manner similar to elements 410, 411 and 420 in FIG. 4. The output signals representing the four lines, which are passed by the detectors DET1-DET4, are thereafter processed like the signals from four lines in the FIG. 3 apparatus.

A still further embodiment may include circuitry of the type shown in FIG. 3 and circuitry of the type shown in FIG. 4 with additional circuitry for combining, in predetermined proportions, the signals provided by the two circuits.

Figure 6:
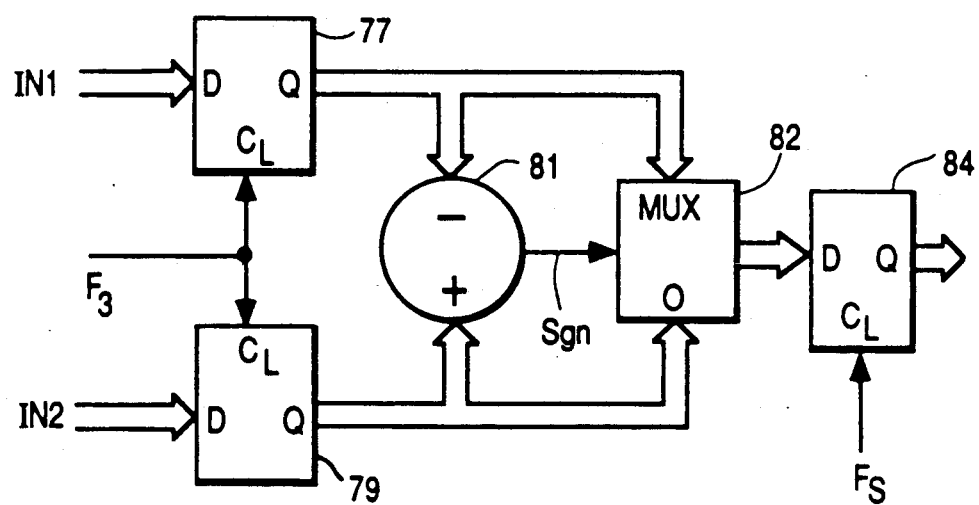
FIG. 6 is a circuit diagram of a max(min) selector which may be utilized in the FIG. 3 and 4 circuitry.

FIG. 6 illustrates circuitry which may be implemented for the maximum and/or the minimum detectors. In the exemplary circuitry the applied signals are assumed to be in sampled data format occurring at a rate $f_s$ and synchronous with a clock signal $F_s$. The signals may be parallel bit binary samples. The two input connections are designated In1 and In2. These input connections are coupled to the data input terminals of a pair of "D" type latches 77 and 79. The latches 77 and 79 store successive input samples responsive to a sample rate clock signal $F_s$. The respective samples stored in the latches 77 and 79 are coupled to the minuend and subtrahend input terminals of a subtracter 81 and to the signal input terminals of a two-to-one multiplexer 82. The sign bit output connection of the subtracter 82 is coupled to the control input terminal of the multiplexer 82. If the sample applied to the terminal In1 is greater than the sampled applied to the terminal In2, the sign bit of the difference generated by the subtracter will exhibit a "one" state and condition the multiplexer to pass the sample provided by the latch 77. Conversely if the sample applied to terminal In2 is greater than the sample applied to terminal In1, the sign bit will exhibit a 0 state and condition the multiplexer to pass the sample provided by the latch 79. If the samples at both terminals In1 and In2 are equal it does not matter which sample is passed by the multiplexer. Samples provided by the multiplexer are coupled to a synchronizing latch 84 which is clocked by the sample clock $F_s$.

As set forth above the circuitry of FIG. 6 operates as a maximum detector. This circuitry can be arranged to operate as a minimum detector by either interchanging the signal input connections to the multiplexer 82 or complementing the sign bit used to control the multiplexer 82.

The foregoing circuitry has been configured for processing NTSC signals. Signals formatted in other broadcast standards may be processed by appropriately altering ones of the delay elements. For example PAL signals may be processed using circuitry of the type shown in FIG. 3 if the delay elements 52 and 56 are designed to provide delay intervals of 312 line periods.

What is claimed is:

1. Video signal processing apparatus for increasing the number of raster scan lines of a displayed image including an interstitial line generator comprising:
   a source of video signal;
   means coupled to said source for producing a plurality of relatively delayed signals representing horizontal lines disposed temporally and spatially about the location of an interstitial line;
   means responsive to said plurality of relatively delayed signals for excluding the relatively positive and relatively negative extrema of said plurality of relatively delayed signals; and
   means for combining the remaining of said relatively delayed signals in predetermined proportions to generate said interstitial line of signal.

2. The apparatus set forth in claim 1 wherein the means for providing a plurality of relatively delayed signals includes:
   first and second delay elements, each for delaying a signal respectively applied thereto by 262 horizontal line intervals;
   a third delay element for delaying a signal applied thereto by one horizontal line interval; and
   means for cascade coupling said first delay element, said third delay element and said second delay element in the order recited, and wherein said plurality of relatively delayed signals are provided at an input terminal of said first delay element and at respective output terminals of said first, second and third delay elements.

3. The apparatus set forth in claim 2 wherein the means for excluding the relatively positive and relatively negative extrema comprises:
   first and second means having respective first input connections coupled to the input terminal of said first delay element and respective second input connections coupled to the output terminal of said second delay element, said first and second means for passing respectively the larger and smaller of two signals applied to their respective first and second input connections;
   third and fourth means having respective first input connections coupled to the output terminal of said first delay element and having respective second input connections coupled to the output terminal of said third delay element, said third and fourth means for passing respectively the larger and smaller of two signals applied to their respective first and second input connections;
   fifth means, coupled to said first and third means, for passing the smaller of two signals passed thereby;
   sixth means, coupled to said second and fourth means, for passing the larger of two signals passed thereby;
   said fifth means excluding said relatively positive extrema and said sixth means excluding said relatively negative extrema.

4. An interlace to non interlace scan converter including an interstitial line generator comprising:
   a source of an interlace scan video signal;

means responsive to said interlace scan video signal for providing a plurality of relatively delayed video signals representing video signals from a plurality of field intervals;

first means responsive to a first subset of said plurality of relatively delayed video signals for excluding the relative extrema thereof and passing at least a first signal representing at least one of said relatively delayed video signals from said first subset;

second means, responsive to a second subset of said plurality of relatively delayed video signals for excluding the relative extrema thereof and passing at least a second signal representing at least one of said relatively delayed video signals of said second subset;

third means, responsive to a third subset of said plurality of relatively delayed signals, said at least first signal and said at least second signal, for excluding the relative extrema thereof and for combining the remaining signals of said third subset, said at least first signal and said at least second signal in predetermined proportions to generate said interstitial line.

* * * * *